United States Patent
Brockmanns et al.

(10) Patent No.: US 9,518,342 B2
(45) Date of Patent: Dec. 13, 2016

(54) METHOD OF PRODUCING A TUBULAR FIBER ARRANGEMENT OF A FIBER-REINFORCED COMPOSITE PART, AND TUBULAR FIBER ARRANGEMENT

(71) Applicant: SGL KUEMPERS GMBH & CO. KG, Rheine (DE)

(72) Inventors: Karl-Josef Brockmanns, Willich (DE); Franz-Juergen Kuempers, Rheine (DE); Gregor Baumgart, Viersen (DE)

(73) Assignee: SGL Kuempers GmbH & Co. KG, Rheine (DE)

( * ) Notice: Subject to any disclaimer, the term of this patent is extended or adjusted under 35 U.S.C. 154(b) by 381 days.

(21) Appl. No.: 13/945,069

(22) Filed: Jul. 18, 2013

(65) Prior Publication Data

US 2013/0302571 A1 Nov. 14, 2013

Related U.S. Application Data

(63) Continuation of application No. PCT/EP2012/050650, filed on Jan. 17, 2012.

(30) Foreign Application Priority Data

Jan. 18, 2011 (DE) .......................... 10 2011 002 840

(51) Int. Cl.
*B29C 53/60* (2006.01)
*B29C 53/68* (2006.01)
(Continued)

(52) U.S. Cl.
CPC ............... *D01D 5/24* (2013.01); *B29C 53/665* (2013.01); *B29C 70/24* (2013.01); *B29C 70/38* (2013.01);
(Continued)

(58) Field of Classification Search
CPC ............... D04C 3/40; D04C 1/00; D04C 3/42; D04C 3/44; D03D 3/02; D01D 5/24; B29C 53/665; B29C 53/66; B29C 53/566; B29C 70/205; B29C 70/222; B29C 70/24; B29C 70/38; B29C 53/60; B29C 53/68; B29C 53/70
(Continued)

(56) References Cited

U.S. PATENT DOCUMENTS 2,041,950 A * 5/1936 Pierce ...................... D04C 1/06
102/325
2,259,974 A * 10/1941 Haehnel ................... D04B 1/26
66/89
(Continued)

FOREIGN PATENT DOCUMENTS

DE 78 26 718 U1 2/1979
DE 19625798 A1 1/1997
(Continued)

OTHER PUBLICATIONS

International Search Report of PCT/EP2012/050650, Dated Jun. 12, 2012.

*Primary Examiner* — Amy Vanatta
(74) *Attorney, Agent, or Firm* — Laurence A. Greenberg; Werner H. Stemer; Ralph E. Locher

(57) ABSTRACT

A method for producing a tubular fiber arrangement of a fiber-reinforced composite part and a tubular fiber arrangement as an intermediate product for a composite part. The local conditions are taken into account in an especially simple and reliable manner with respect to the geometry of the composite part and its load profile. When forming the composite part on a core, the fiber mass supplied during the formation of the tube is proportional to the local circumference of the composite part which results from the diameter.

(Continued)

The advancement speed of the core remains substantially constant.

9 Claims, 11 Drawing Sheets

(51) Int. Cl.
*B29C 70/24* (2006.01)
*B29C 70/38* (2006.01)
*D01D 5/24* (2006.01)
*B29C 53/66* (2006.01)
*B29L 23/00* (2006.01)

(52) U.S. Cl.
CPC ..... *B29L 2023/00* (2013.01); *Y10T 428/24612* (2015.01)

(58) Field of Classification Search
USPC .......... 28/142, 143; 139/387 R; 87/9, 11, 34
See application file for complete search history.

(56) References Cited

U.S. PATENT DOCUMENTS

| | | | | |
|---|---|---|---|---|
| 2,407,929 A * | 9/1946 | Jeckel | ...................... | D04C 1/00 604/527 |
| 3,506,420 A * | 4/1970 | Jackson, Jr. | ......... | B65H 57/006 156/167 |
| 4,147,822 A * | 4/1979 | Kallmeyer | ............... | D03D 3/00 139/16 |
| 4,157,181 A * | 6/1979 | Cecka | ................... | A63B 53/10 138/130 |
| 4,228,207 A | 10/1980 | Porte et al. | | |
| 4,771,518 A * | 9/1988 | LaPointe | ................. | A61F 13/04 138/123 |
| 4,790,898 A | 12/1988 | Woods | | |
| 4,983,240 A * | 1/1991 | Orkin | ....................... | D04C 1/06 156/148 |
| 5,100,713 A * | 3/1992 | Homma | .................. | B29C 70/10 139/383 R |
| 5,143,374 A * | 9/1992 | Shibasaki | .............. | A63B 53/10 273/DIG. 7 |
| 5,487,806 A * | 1/1996 | Viellard | ................ | B29C 33/505 156/156 |
| 5,800,514 A * | 9/1998 | Nunez | ....................... | A61F 2/06 139/384 R |
| 5,876,544 A * | 3/1999 | Yamamoto | ............. | A63B 53/10 156/171 |
| 8,114,793 B2 | 2/2012 | Kuempers et al. | | |
| 8,647,456 B2 * | 2/2014 | Wagener | ....................... | 156/166 |
| 2008/0300602 A1* | 12/2008 | Schmitt | .............. | A61B 17/8816 606/93 |
| 2010/0010438 A1* | 1/2010 | Simpson | ................ | A61M 25/10 604/96.01 |
| 2010/0291826 A1* | 11/2010 | Kumpers | ............ | B29C 53/8058 442/312 |
| 2014/0135906 A1* | 5/2014 | Winner | .................... | D03D 3/02 623/1.51 |

FOREIGN PATENT DOCUMENTS

| | | |
|---|---|---|
| DE | 102010047193 A1 | 4/2012 |
| EP | 1990303 A1 | 11/2008 |
| WO | 9114480 A1 | 10/1991 |
| WO | 2007090555 A2 | 8/2007 |
| WO | 2008135280 A1 | 11/2008 |

* cited by examiner

METHOD OF PRODUCING A TUBULAR FIBER ARRANGEMENT OF A FIBER-REINFORCED COMPOSITE PART, AND TUBULAR FIBER ARRANGEMENT

CROSS-REFERENCE TO RELATED APPLICATION

This application is a continuation, under 35 U.S.C. §120, of copending international application No. PCT/EP2012/050650, filed Jan. 17, 2012, which designated the United States; this application also claims the priority, under 35 U.S.C. §119, of German patent application No. DE 10 2011 002 840.4, filed Jan. 18, 2011; the prior applications are herewith incorporated by reference in their entirety.

BACKGROUND OF THE INVENTION

Field of the Invention

The present invention relates to a method for producing a tubular fiber arrangement as an intermediate product for a fiber-reinforced composite part. The tubular fiber arrangement has a cross-sectional shape that changes along its length.

Fiber-reinforced composite parts have been gaining increasing popularity because, as compared to conventional components, they have a comparatively light inherent weight and they can be produced and used in a particularly flexible manner.

However, conventional fiber-reinforced composite parts are associated with a problem in that in the formation of hollow profiles, in which the fibers are arranged on a core, the density of the fiber arrangement fluctuates considerably in accordance with the profile of the core or with the target shape of the fiber composite part, and consequently weak points in the mechanical loadability of what will later be the composite part can often arise.

For example, in the case of material input that exceeds the necessary measure during fiber reinforcement the material costs increase, while this also results in geometric problems, namely when as a result of excessive material input the geometry of the base body, on which base body fiber reinforcement is based, is distorted towards the exterior, in other words is not reproduced in the correct proportions.

German published patent application DE 196 25 798 A1 describes a way to avoid producing a textile tube for a motor vehicle driver, which textile tube comprises reinforcement fibers, by tailoring it with considerable expenditure directly onto a core. There, a textile hose is produced that comprises uneven distribution of the fiber material. The distribution has been preventatively matched to the core shape and which when the hose is pulled onto the core is intended to become uniform. In other words an initially denser fiber arrangement later impinges on bulges of the core, and thus is intended, after being pulled on, to adapt to the density of the fiber arrangement in the remaining region. This is associated with a disadvantage in that subsequently pulling the tube onto the core is precisely unlikely to result in this desired effect because, for example, when passing over larger core diameters, regions are widened that are subsequently intended for a smaller core diameter, and in this process fibers or fiber strands are displaced, which ultimately results in uneven strength and stability and thus in weak points in the composite part produced.

U.S. Pat. No. 4,228,207 and its counterpart German utility model DE 78 26 718 U1 describe the production of a tubular braided fabric with a varying diameter as a flexible formation is known that serves as an intermediate product for rigid but lightweight parts, for example resin-impregnated composite parts such as sports articles or for industrial applications. In order to achieve a desired constant thickness of the braided fabric, in this arrangement the braiding angle, in other words the angle of thread placement relative to the longitudinal axis of the braided fabric, is varied, i.e. for smaller cross sections the braiding angle is reduced by means of an increased transport speed during braiding, while for larger cross sections the braiding angle is increased by means of a decreased transport speed. In this manner the direction of the maximum capacity to absorb tensile forces by the fibers, for example glass threads or carbon threads, which are, for example, used for such components, is changed. Now, assuming that the direction of thread placement is to correspond as far as possible to the direction of load of what will become the composite part, in application of the teaching of this document a more or less significant deviation from the thread placement direction and from the direction of force introduction occurs, which significantly reduces the substance exploitation of the expensive fiber materials and requires over-dimensioning of the fiber arrangement in order to achieve the necessary stability values.

In order to adapt a braiding process to the varying cross-sectional shape of the braided core, we have already proposed (cf. the commonly assigned German patent application DE 10 2010 047 193 A1) to flexibly adapt to the present core diameter the diameter of the so-called braiding ring that bundles the braiding threads in front of the braiding point. While this does results in a braiding geometry that is more independent of the diameter, and thus results in an equalization of the braiding conditions, it does not, however, solve the problem of the braiding thickness that varies depending on the diameter.

BRIEF SUMMARY OF THE INVENTION

It is accordingly an object of the invention to provide a tubular, hose-shaped fiber arrangement and a corresponding production process which overcome the above-mentioned disadvantages of the heretofore-known devices and methods of this general type and which provides for a fiber-reinforced composite part and a tubular fiber arrangement as an intermediate product for a composite part, wherein the local conditions are to be taken into account in an especially simple and reliable manner with respect to the geometry of the composite part and its load profile.

With the foregoing and other objects in view there is provided, in accordance with the invention, a method of producing an intermediate product for a fiber-reinforced composite part, the method which comprises:

forming a tubular fiber arrangement (i.e., a hose-shaped assembly) on a core having a shape corresponding to the composite part, with a varying cross-sectional shape along a length thereof, the tubular fiber arrangement forming the intermediate product;

supplying fibers during a formation of the tubular fiber arrangement with a fiber mass being proportional to a local diameter and circumference of the composite part; and maintaining an advance speed of the core substantially constant during the supplying and forming step.

The method according to the invention ensures to the greatest possible extent a constant density and thus also thickness of the fiber arrangement, irrespective of cross-sectional fluctuations of the core on which the fiber arrangement is formed. In this manner, distortions of the geometry of the composite part that will later be formed from the intermediate product of the tubular fiber arrangement are avoided. Above all, however, predetermined fiber alignments that are to coincide with what will later be the direction of load in the composite part are at least not noticeably impeded in the case of changes in diameter. The latter is also in particular achieved in that, in contrast to the state of the art, adapting the fiber mass to the particular cross section of the core on which the tubular fiber arrangement is formed is not implemented by differences in the advance speed, which differences result in different placement angles.

The fiber arrangement according to the present invention is to be interpreted as an arrangement of, in particular, coarse-denier threads or narrow ribbons comprising glass, carbon or other high-strength materials that are commonly used in the production of fiber-reinforced composite parts. Since the diameter or the circumference of the core that corresponds to the shape of the composite part changes more or less quickly or strongly, variation of the fiber mass cannot be carried out completely synchronously. The term "proportional" in this document thus also denotes, for example, that progressive adaptation takes place, and/or that the adaptation does not completely cover all the extremities of the circumferential values, because otherwise the requirements concerning the technical implementation of the variation of the fiber mass might exceed the benefit of said implementation.

Advantageously the fiber arrangement is formed from a non-crimp fabric. This arrangement uses, in particular, so-called 0°-threads, which extend essentially so as to be parallel to the longitudinal extension of the core and which are intended to absorb longitudinal forces, and wrap threads, which extend at angles of between 0° and 90° to the longitudinal extension of the core. Non-crimp fabrics are associated with an advantage in that as a result of the avoidance of intersection points that occur in braided fabrics or knitted fabrics, the fibers are arranged so as to be highly stretched, thus providing excellent force absorption behavior. An intersecting fiber structure is then, however, well suited to tie the non-crimp fabric in order to prevent its mutual displacement and in order to fix the thread formation until resin impregnation takes place at a later stage. Such methods are described, for example, in our commonly assigned U.S. Pat. No. 8,114,793 B2 and its counterpart international patent application WO 2007/090555 A2, and they need therefore not be described in more detail in this document.

In particular a braided fabric can be considered as an intersecting thread structure. However, as an alternative, a knitted fabric structure is suitable to tie the layers of non-crimp fabric.

Changing the fiber mass can advantageously be achieved in that the fineness of the supplied threads changes. To this effect by means of a removal device the number of individual fibers from which the respective threads are formed can be reduced, or can be increased by means of an automated application device. Advantageously, the removal device and the application device are combined in one device, because after removal of fibers the renewed application of fibers is necessary to achieve the previous thread fineness. Advantageously, in order to apply fibers, adhesives are used that with regard to subsequent impregnation are resin-based.

Instead of varying the thread fineness of the threads used, adaptation of the fiber mass can also occur, for example by varying the number of threads involved in forming the non-crimp fabric. Reducing the number of threads is achieved by detaching threads. Increasing the number of threads is achieved in that, for example, previously detached threads that have been kept in reserve are supplied again. In this case, too, fixing the starting ends of the threads can be supported by an adhesive.

In order to determine the local cross section of the composite part or of the core to which the tubular fiber arrangement is to be allocated, mechanical touch sensors or planar photoelectric barrier arrangements or similar are imaginable.

With the above and other objects in view there is also provided, in accordance with the invention, an article of manufacture, which comprises:

a tubular fiber arrangement forming an intermediate product for a fiber-reinforced composite part having a variable cross-section along a length thereof, wherein said tubular fiber arrangement is formed on a core having a shape corresponding to the composite part;

a fiber mass of said tubular fiber arrangement in a cross section of the core being proportional to a local circumference resulting from a diameter of the core; and wherein an alignment of the fibers in the tubular fiber arrangement is largely constant, irrespective of the local circumference of the core.

In other words, the tubular fiber arrangement according to the invention, which fiber arrangement serves as an intermediate product for a fiber-reinforced composite part, comprises a fiber mass that in the cross section of the core on which it rests is proportional to the local circumference resulting from the diameter of the core, wherein the alignment of the fibers is largely constant relative to the longitudinal direction of the core, irrespective of the local circumference of the core. This results in a uniform structure of the composite part and above all in reliably good alignment of the fibers in what will later be the direction of load.

Other features which are considered as characteristic for the invention are set forth in the appended claims.

Although the invention is illustrated and described herein as embodied in a method for producing a tubular fiber arrangement of a fiber-reinforced composite part and tubular fiber arrangement, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE INVENTION

Figure 1:
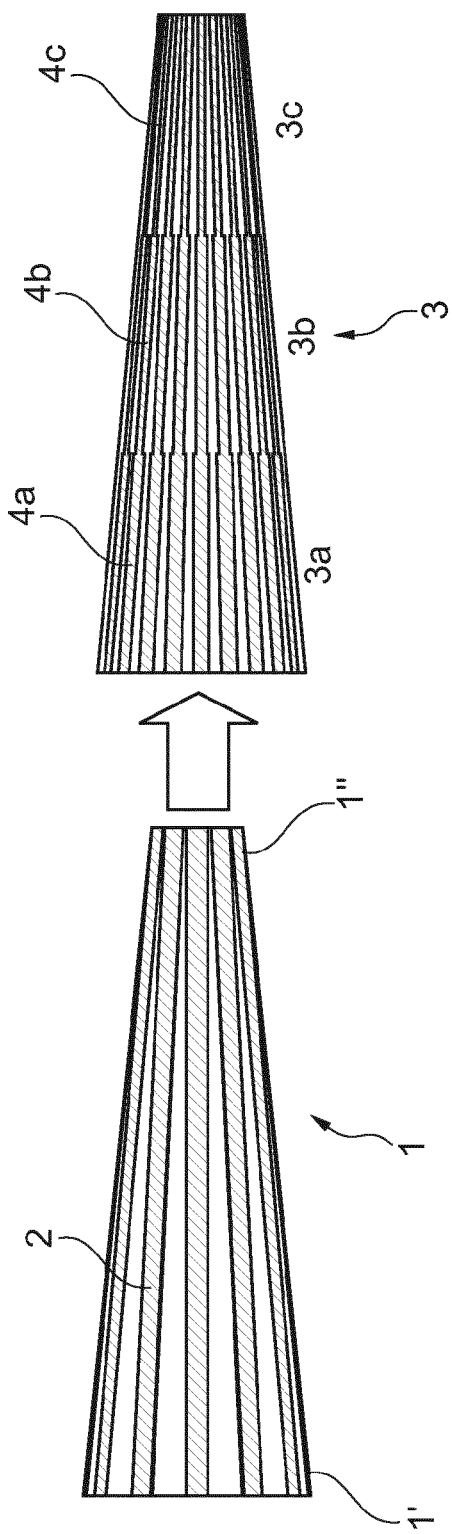
FIG. 1 shows two composite parts, each designed in the manner of a truncated cone, the first according to prior art and the second according to the invention.

Referring now to the figures of the drawing in detail and first, particularly, to FIG. 1 thereof, there is shown a composite part according to the prior art on the left-hand side with a shape of a truncated cone. The prior art device shows the allocation with so-called stationary threads (0°-threads) 2 with a constant fiber mass along the length of the composite part 1. This results in a gradually reduced fiber allocation of the circumference of the composite part in the direction from the small diameter to the large diameter. In the region of the large diameter the threads are clearly spaced apart, which has a negative effect on the force absorption in the longitudinal direction in the composite part. In contrast to this, a fiber allocation that overall is more dense would result in the threads overlapping in the region of the small diameter, in that said threads are over-dimensioned for force introduction, thus resulting in distortion of the geometry towards the exterior. As compared with the above, the embodiment shown on the right-hand side in FIG. 1 of the same fiber composite part shows that in all three sections 3a to 3c the average thread spacing is identical. The stationary threads 4a to 4c comprise different fiber masses; in other words the fiber mass of the threads 4a to 4c decreases incrementally from the large diameter/circumference to the small diameter/circumference. Changing the fiber mass within each section 3a to 3c can be ignored. In the sense of the invention the fiber mass is split proportionally to the diameter or to the circumference of the composite body.

Referring to FIGS. 2 to 10, there is shown how the fineness of a thread can be varied by way of a removal and application device 5. For example, a carbon thread 6 is transported by means of a transport device 7 and is subsequently fed as a stationary thread to a braiding device (not shown). In the braiding device a multitude of stationary threads supplied in parallel are then tied by intersecting threads.

Figure 2:
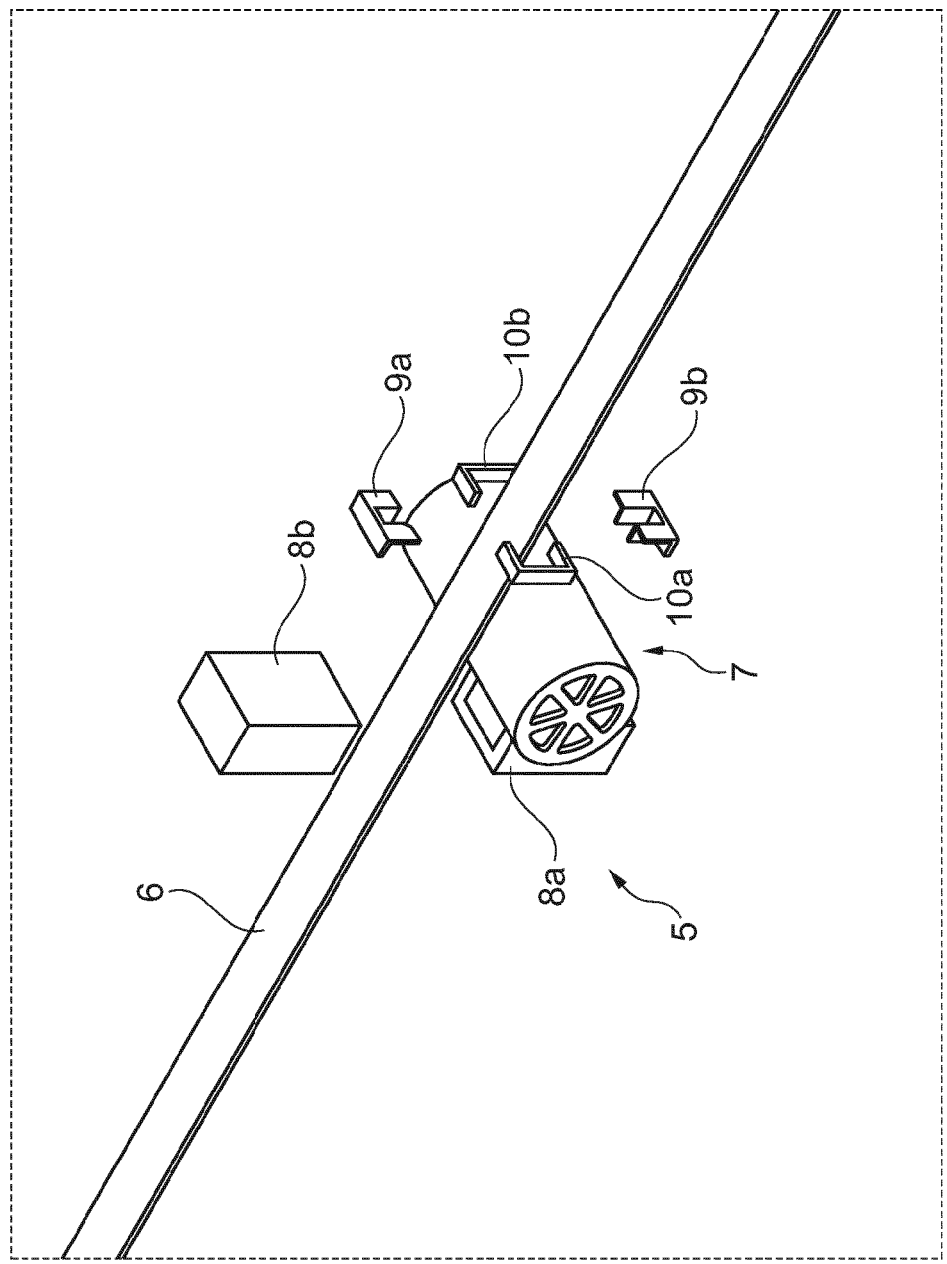
FIGS. 2 to 10 are diagrams illustrating the method-related procedure in reducing the fiber mass and subsequently restoring the old fiber mass.
Figure 3:
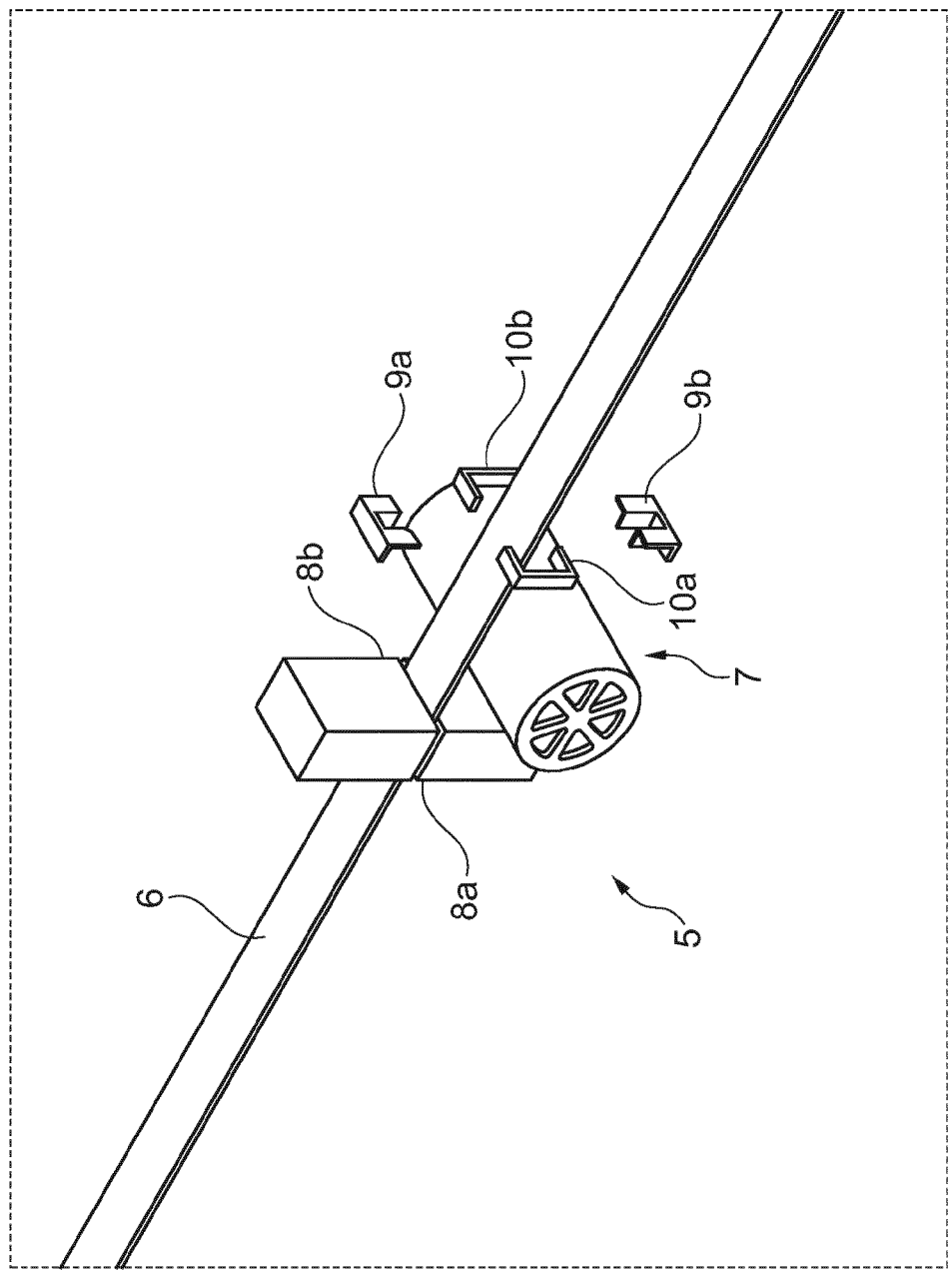
Figure 4:
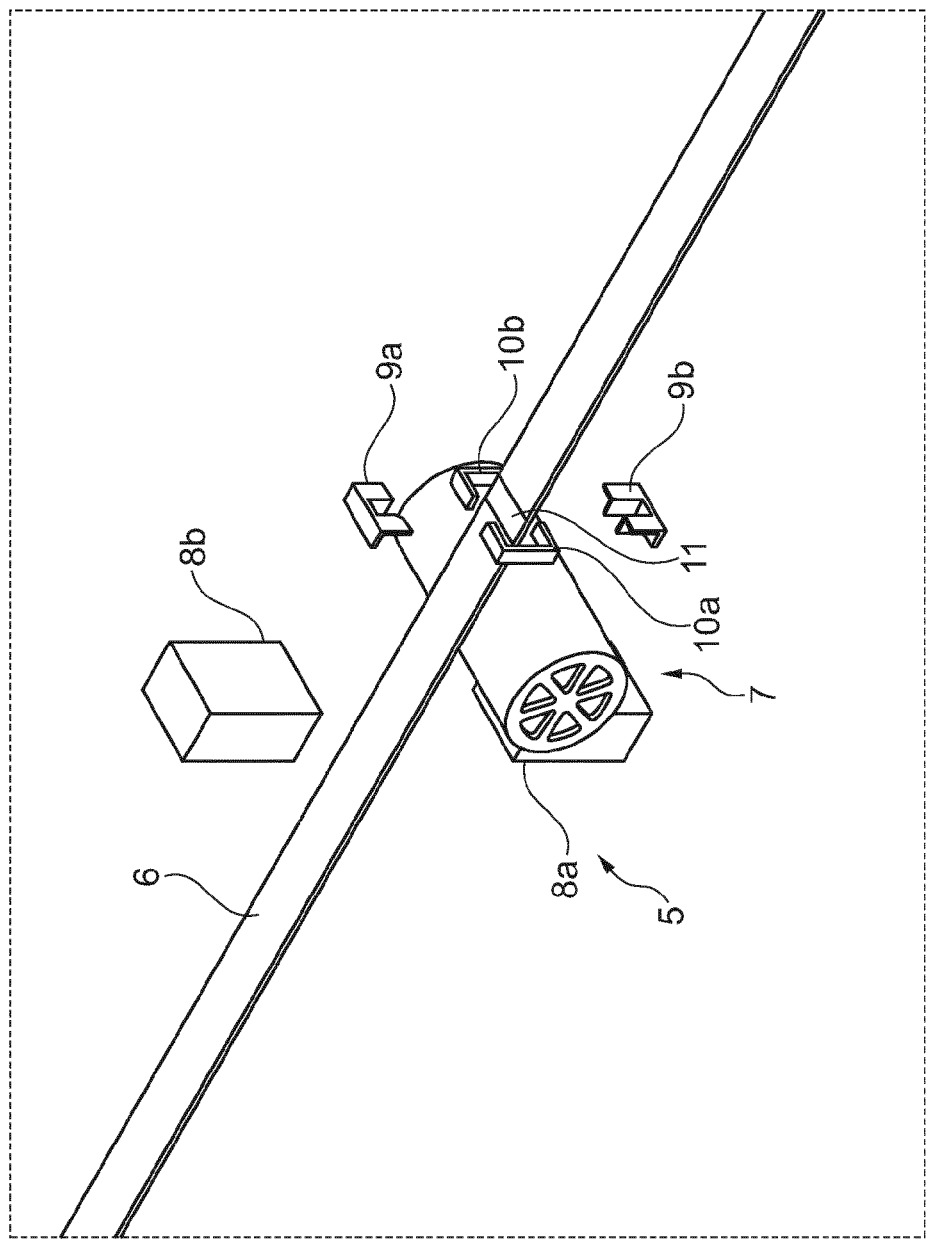
Figure 5:
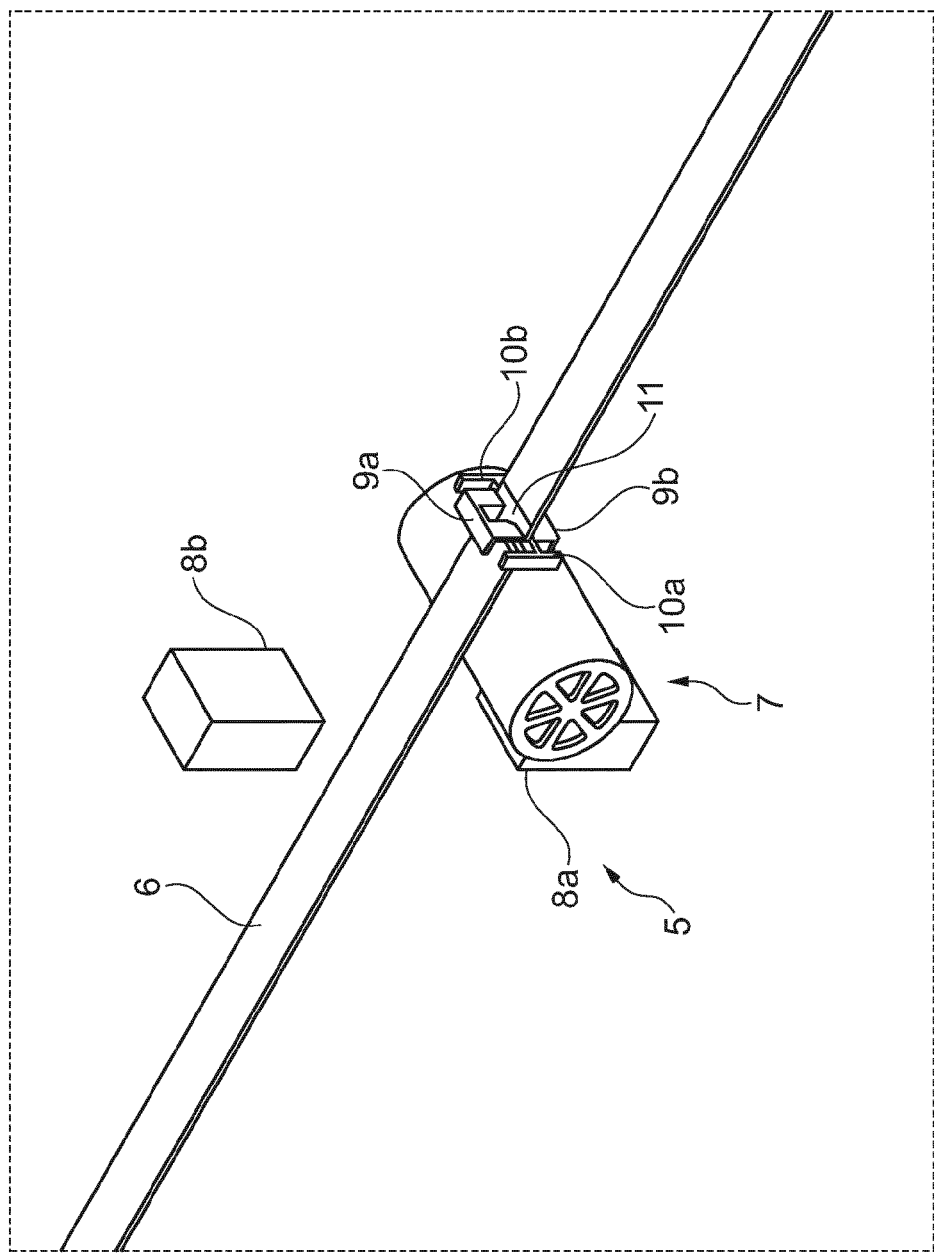

In the initial position in FIG. 2 the carbon thread 6 has a constant width or thread fineness. FIG. 3 shows that by means of a so-called labeling device 8a, 8b a label is applied for stabilization, which label then reinforces an interface at which the thread width suddenly changes. In FIG. 4 the section comprising a label is fed to a separating device 9a, 9b with a clamping device 10a, 10b. FIG. 5 shows that the separating device 9a, 9b is operated while by means of the clamping device 10a, 10b the carbon thread 6 is affixed in the region of separation.

Figure 6:
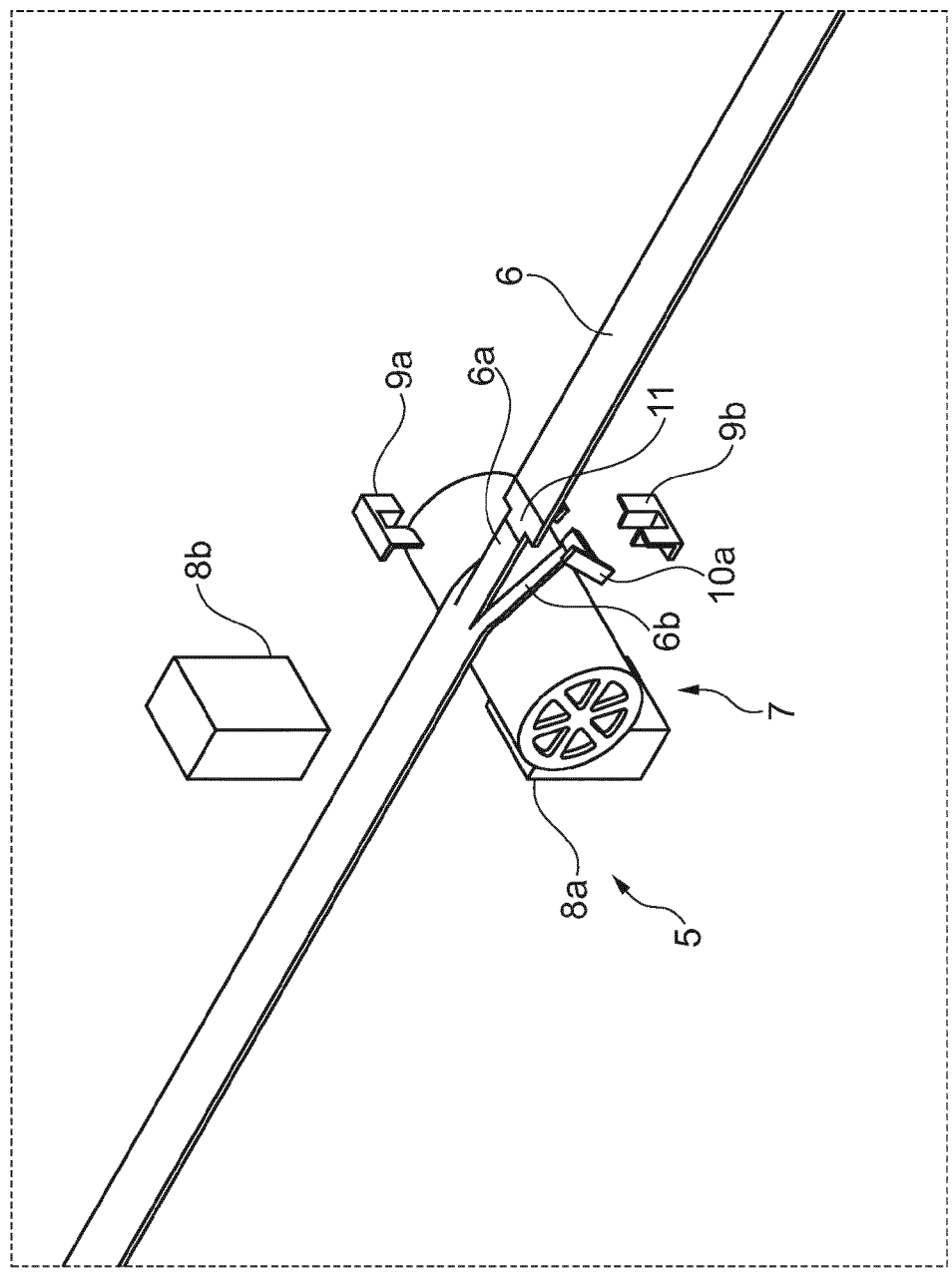

FIG. 6 shows that split-off longitudinal sections 6b, 6c of the carbon thread 6 are separated and led away from the clamping device 10a or 10b.

Figure 7:
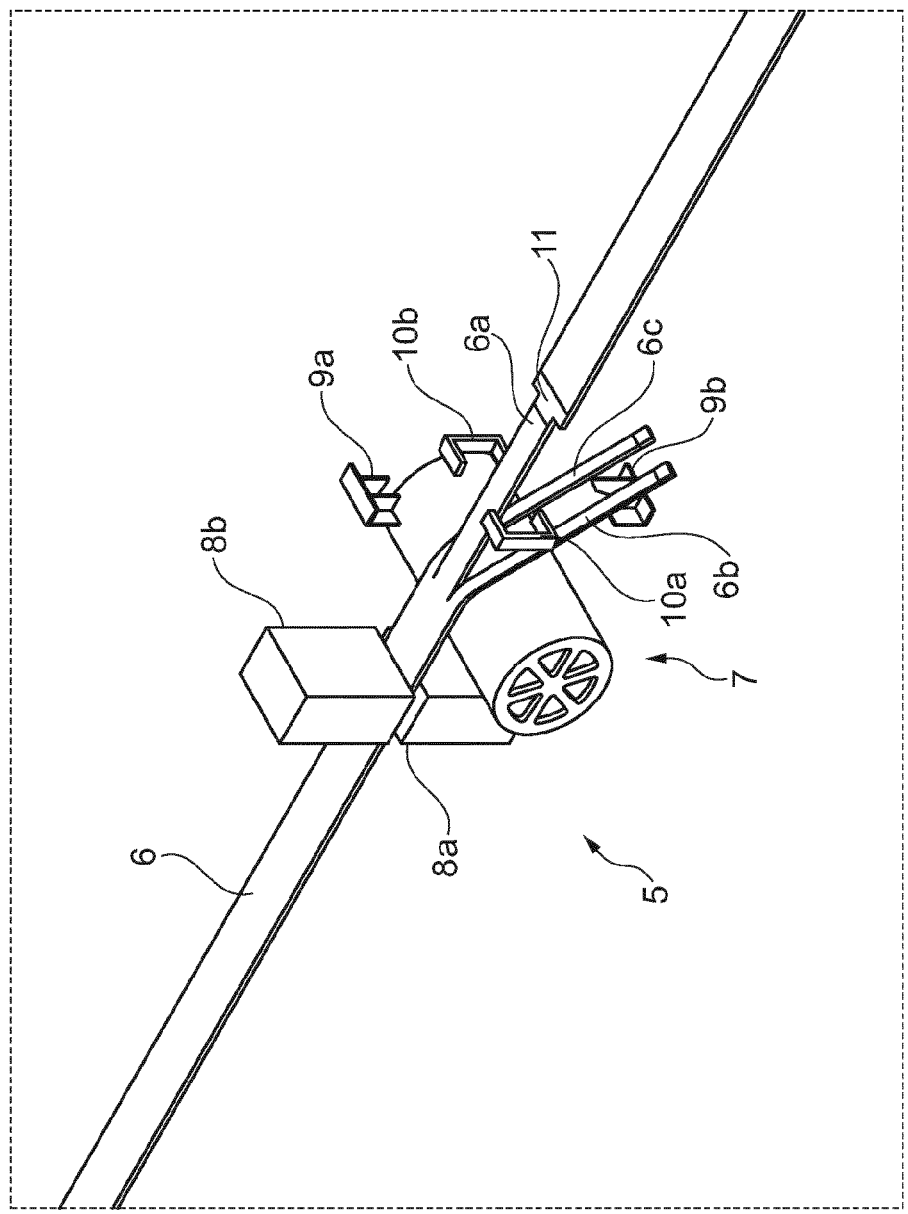
Figure 8:
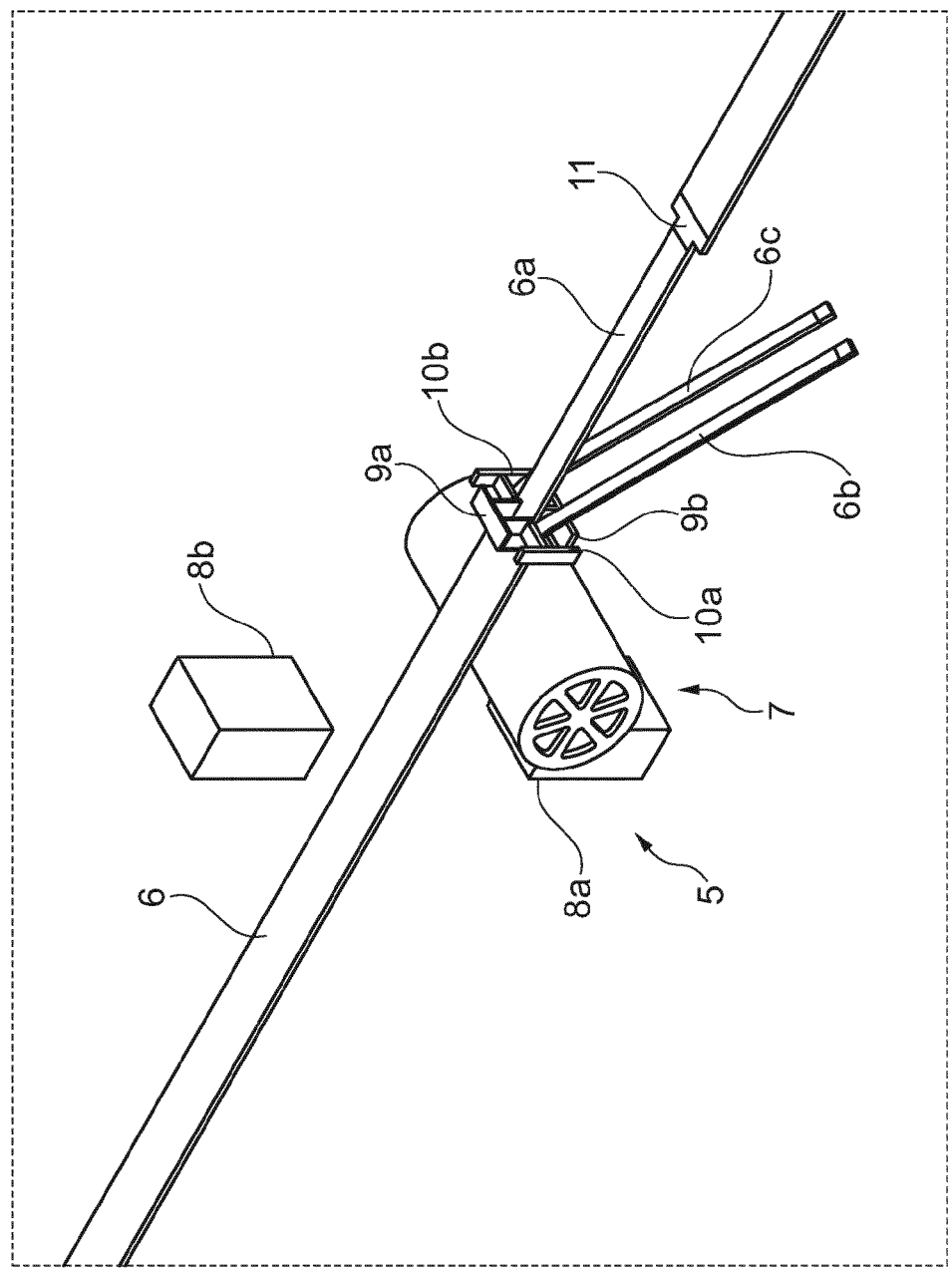

FIG. 7 shows the further progress of the movement of the carbon thread 6, wherein the separated sections 6b and 6c and the remaining middle section 6a are now longer. Meanwhile the labeling device 8a, 8b is active again and applies a new label at the position at which the subsequent change in fiber mass is to take place. This is shown in FIG. 8, in which in the region of the second label the device 9a and 9b and the clamping devices 10a and 10b are active.

Figure 9:
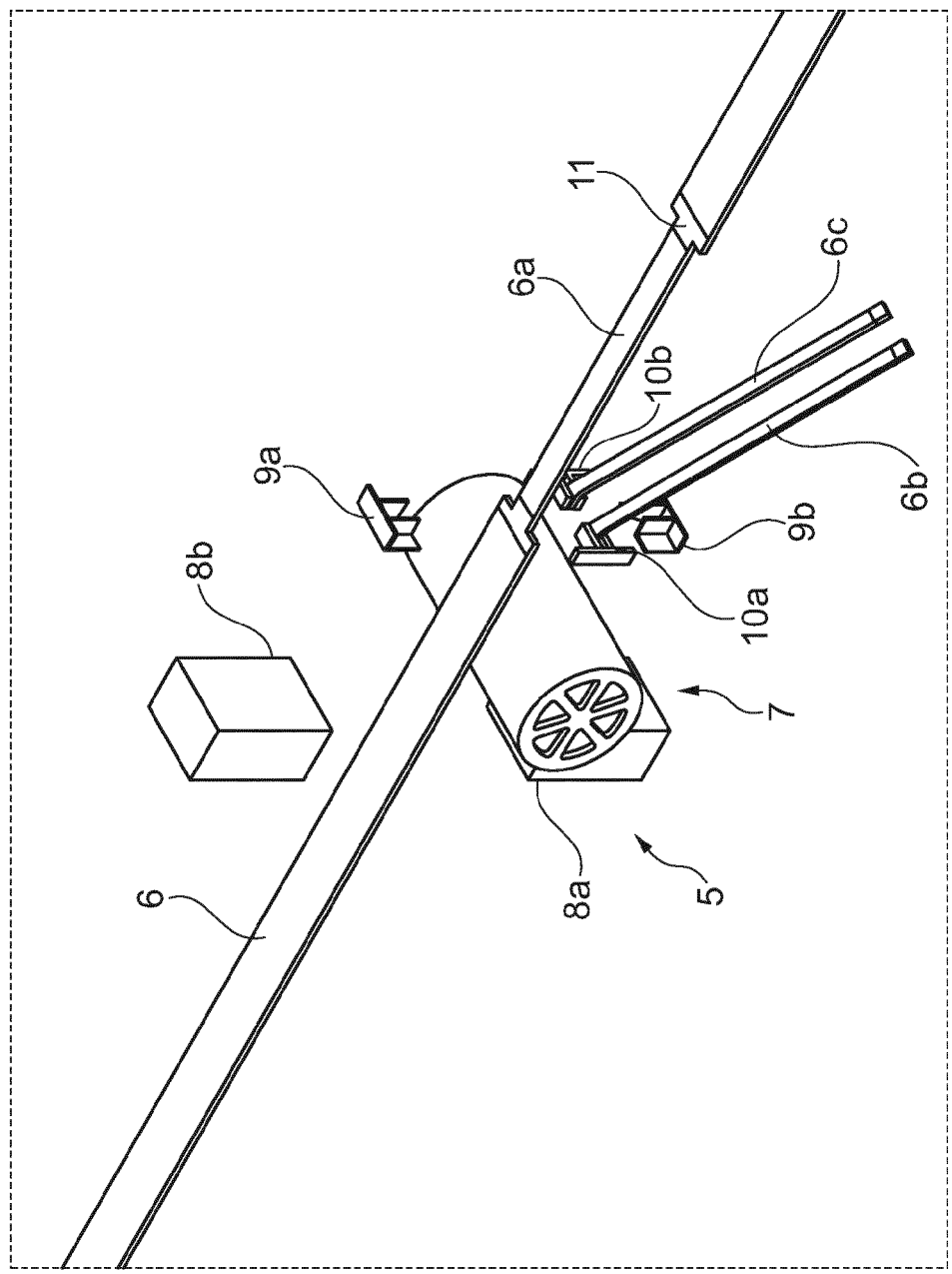
Figure 10:
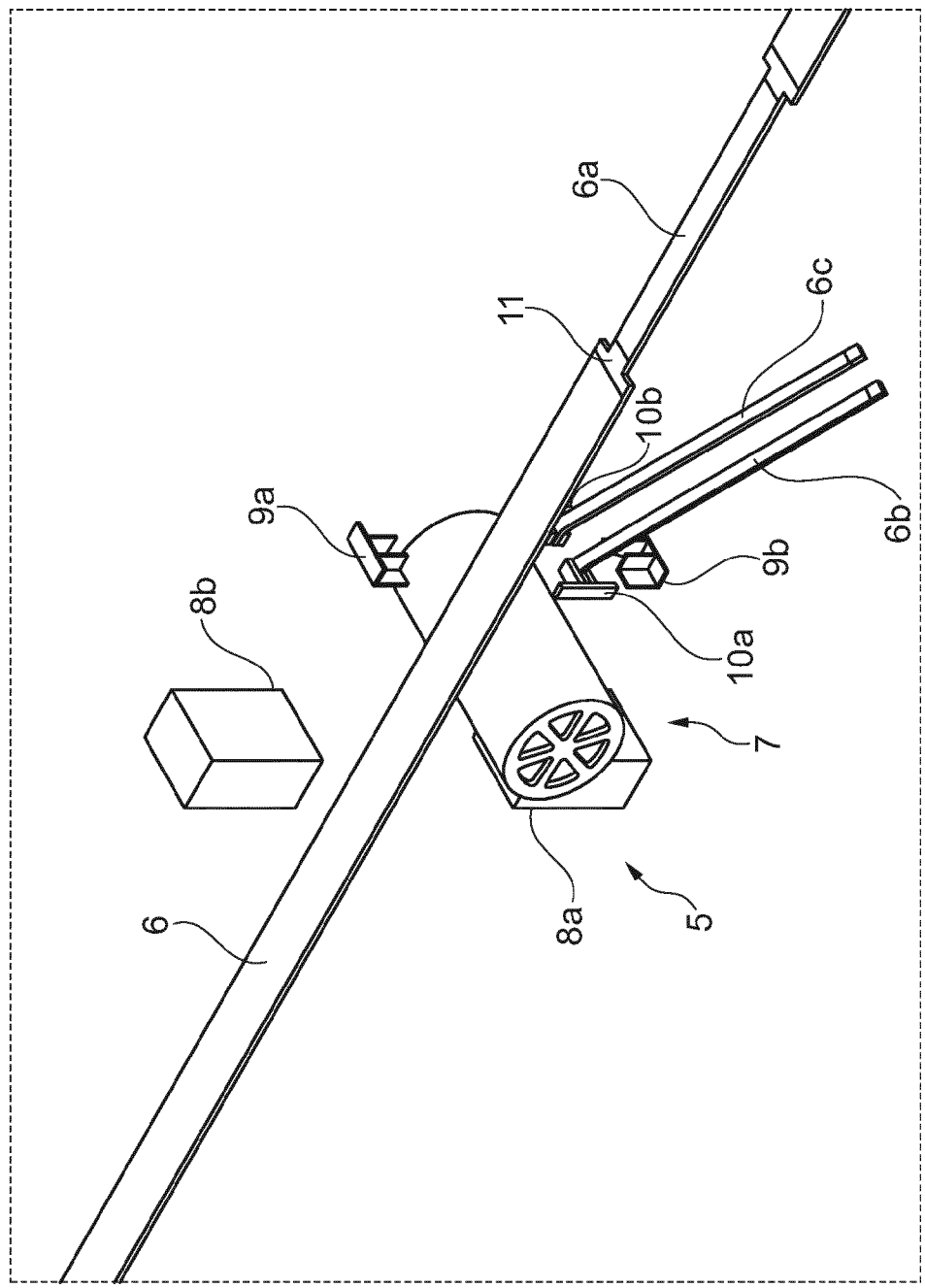

FIG. 9 shows the manner in which the separated thread sections 6b and 6c are removed. Behind the section 6a with a reduced fiber mass the "normal" carbon thread 6 joins. A carbon thread 6, 6a treated in this manner and supplied as a stationary thread would, for example, be used if a section with a smaller diameter extends between two sections with a large diameter. This exemplary embodiment is associated with an advantage in that the removal device and the application device are combined in one device. This device is suitable for applications in which the carbon threads 6 predominantly comprise sections in which maximum fineness of the thread is required. Otherwise, fiber removal would be excessive, although the fibers removed from the carbon thread 6 can be recycled. As an alternative it is imaginable to re-use the detached thread sections in the same process in which they are placed onto the carbon thread 6 at positions where due to a large diameter it is necessary to provide great fineness of the carbon thread.

It is also possible to implement the process of generating sections of different thread fineness in a discontinuous manner, in other words in increments. This can, for example, be achieved in that initially threads are produced that in each case comprise sections with different thread fineness, which threads are subsequently wound onto a carrier. In a downstream process the threads are then pulled off. However, this requires very precise attunement of the processes in order to prevent the summation of phase shifts. Such an application may be considered in particular if identical cores are occupied in sequence, or if composite parts are produced and in each case at the beginning of a new part synchronization takes place, for example by removing a thread section or by varying the mutual spacing.

However, it is also imaginable to interconnect different thread sections, in other words thread sections of different fineness. For this purpose it would be possible, for example, to use a method and a device as described in our commonly assigned international patent application publication WO 2008/135 280 A1.

Figure 11:
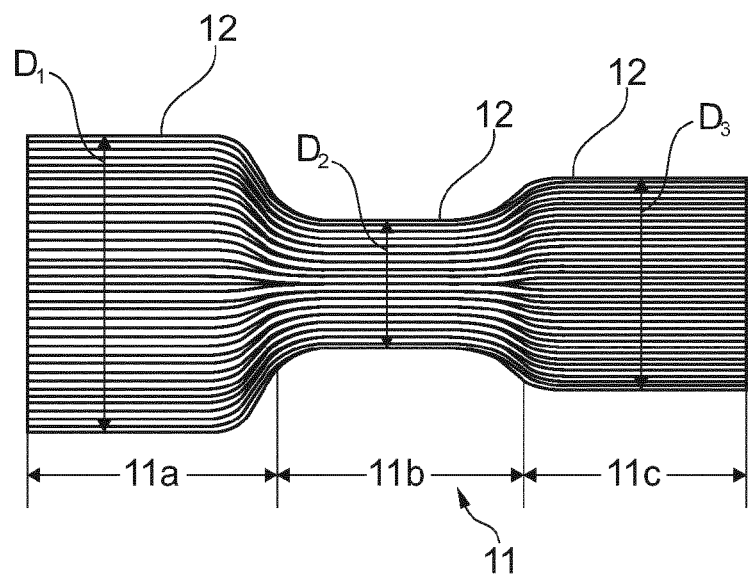
FIG. 11 shows a composite part comprising three different diameters and allocation with a thread number that varies according to the diameter.

In the version of a composite part 11 as shown in FIG. 11, which composite part 11 comprises the sections 11a to 11c the respectively supplied fiber mass is varied by the number of the threads 12 that are also formed as stationary threads. As is shown in FIG. 11, in the region of the diameter D1, which at the same time is the largest diameter on the composite part 11, the number of stationary threads are greatest. This section 11a is followed by a section 11b, in which the lowest number of stationary threads are used, while in the adjoining region 11c, because of the average diameter D3, an average number of threads 12 are used. It makes sense, in those positions in which the number of threads changes to ensure, by means of an adhesive, that the proper supply of stationary threads can take place. These positions do not represent a weak point in later use, because initially this is an intermediate product that receives its final stability by resinification.

Figure 12:
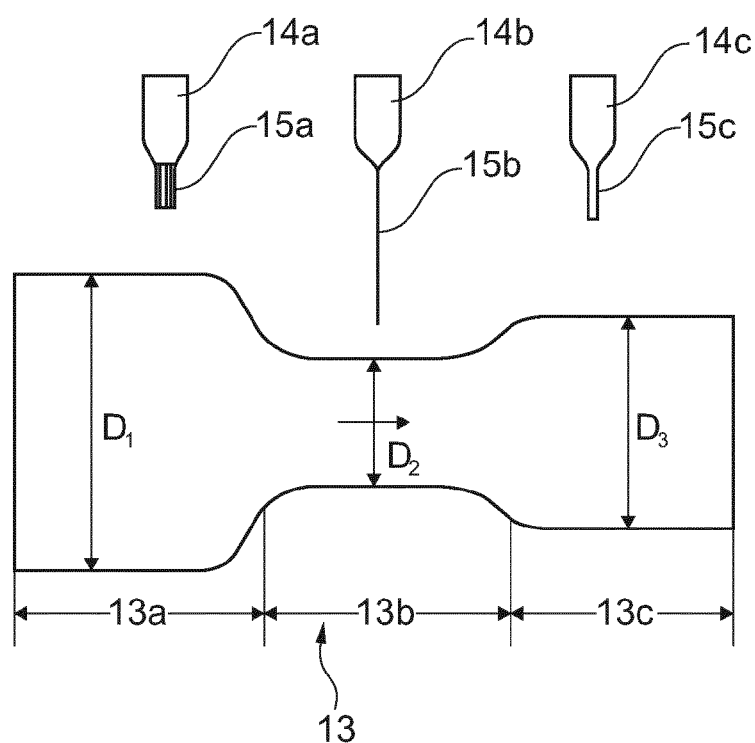
FIG. 12 is a schematic of a composite part with a structure comparable to the one illustrated in FIG. 11 for allocation with wrap fibers.

FIG. 12 shows that a composite part 13 which as shown by an arrow is moved, for example, from left to right, is occupied with wrap threads 15a to 15c that are supplied by means of winding heads 14a to 14c. The sections 13a to 13c again comprise different diameters D1 to D3 to which in each case the thickness of the composite threads 15a to 15c is matched so that essentially identical occupation with wrap fibers can take place irrespective of the particular diameter. For this purpose the winding heads 14a to 14c rotate helically around the composite body 13 that is in the process of advancing. The movement of the composite body during the winding process is constant, and consequently the pitch of the threads is also constant and corresponds to the placement angle desired with regard to subsequent force introduction. Furthermore, the varying thread thickness results in the occupation density varying only insignificantly, for example in the transition regions.

In order to ensure that thread placement in the composite component takes account of different load directions, as a rule various types of non-crimp fabric, in other words the application of threads in different directions, are/is combined. For example, the process of entering stationary threads and the process of wrapping could take place one after the other on the same basic component, wherein at the beginning of the loading process only a core material is present which essentially already has the shape of what will later be the composite part.

Fixing the threads of the non-crimp fabric subsequently takes place, for example by way of a circular braider, as described, for example, in the above-mentioned U.S. Pat. No. 4,228,207 (corresp. to German utility model DE 78 26 718 U1) or in the above-mentioned German published patent application DE 10 2010 047 193 A1. The latter, for example, DE 10 2010 047 193 A1 shows the manner in which the transport of the core and the acquisition of the local diameter by way of sensor technology take place.

The invention claimed is:

1. A method of producing an intermediate product for a fiber-reinforced composite part, the method which comprises:
    forming a tubular fiber arrangement on a core having a shape corresponding to the composite part, with a varying cross-sectional shape along a length thereof, the tubular fiber arrangement forming the intermediate product;
    supplying fibers during a formation of the tubular fiber arrangement with a fiber mass being proportional to a local diameter and circumference of the composite part; and
    maintaining an advance speed of the core substantially constant during the supplying and forming step.

2. The method according to claim 1, which comprises forming the fiber arrangement as a non-crimp fabric.

3. The method according to claim 2, wherein the non-crimp fabric comprises longitudinally extending fibers.

4. The method according to claim 1, which comprises producing the fiber mass that changes depending on the local circumference of the composite part from threads having a lesser or a greater fineness.

5. The method according to claim 4, which comprises processing the threads by removing a predetermined number of fibers from the threads.

6. The method according to claim 5, which comprises removing the fibers from the threads by way of an automated removal device.

7. The method according to claim 4, which comprises processing the threads by adding a predetermined number of fibers to the threads.

8. The method according to claim 7, which comprises applying the fibers to the threads by way of an automated application device.

9. The method according to claim 1, which comprises varying a number of threads for producing the fiber mass that changes depending on the local circumference of the composite part.

* * * * *